(12) United States Patent
Richards

(10) Patent No.: US 6,778,326 B1
(45) Date of Patent: Aug. 17, 2004

(54) COMBINED HEAT FILTER AND CONDENSER LENS, A PROJECTION TYPE APPARATUS USING SUCH, AND A METHOD FOR FABRICATING IT

(75) Inventor: David A. Richards, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1100 days.

(21) Appl. No.: 08/855,556

(22) Filed: May 13, 1997

Related U.S. Application Data

(63) Continuation of application No. 08/413,050, filed on Mar. 29, 1995, now abandoned.

(51) Int. Cl.[7] .......................... G02B 27/44; G02B 3/00; G03B 21/18; G03B 21/20
(52) U.S. Cl. .................. 359/565; 359/569; 359/722; 359/742; 359/350; 353/55; 353/102
(58) Field of Search ................... 359/350, 355, 359/356, 742, 722, 800, 801, 820, 566, 565, 568, 569; 353/55, 56, 102; 362/294

(56) References Cited

U.S. PATENT DOCUMENTS

| | | | | |
|---|---|---|---|---|
| 3,632,198 A | * | 1/1972 | Puffer | 353/60 |
| 3,953,730 A | | 4/1976 | Henry et al. | 250/227 |
| 3,982,822 A | * | 9/1976 | Conder et al. | 359/742 |
| 4,118,761 A | * | 10/1978 | Dey | 359/853 |
| 4,583,815 A | * | 4/1986 | Taga et al. | 359/359 |
| 4,643,524 A | * | 2/1987 | Mori | 385/33 |
| 4,850,685 A | | 7/1989 | Kamakura et al. | 359/634 |
| 4,900,129 A | * | 2/1990 | Vanderwerf | 359/742 |
| 5,022,740 A | * | 6/1991 | Maziork | 359/742 |
| 5,036,025 A | * | 7/1991 | Lin | 501/48 |
| 5,046,838 A | * | 9/1991 | Iwasaki | 353/101 |
| 5,218,471 A | * | 6/1993 | Swanson et al. | 359/565 |
| 5,234,871 A | * | 8/1993 | Krashkevich | 501/73 |
| 5,262,880 A | * | 11/1993 | Abileah | 359/66 |
| 5,353,211 A | * | 10/1994 | Merko | 362/294 |

FOREIGN PATENT DOCUMENTS

| | | | | |
|---|---|---|---|---|
| JP | 58-43401 | * | 3/1983 | 359/742 |
| JP | 59-180501 | * | 10/1984 | 359/742 |
| JP | 03-23415 | * | 1/1991 | G02B/27/46 |
| JP | 04-9803 | * | 1/1992 | G02B/5/18 |

OTHER PUBLICATIONS

G. J. Swanson, "Binary Optics Technology: The Theory and Design of Multi–Level Diffractive Optical Elements", Mass. Inst. Tech., Lincoln Laboratory, Technical Report 854, Aug. 1989.*

* cited by examiner

*Primary Examiner*—Cassandra Spyrou
*Assistant Examiner*—John Juba, Jr.
(74) *Attorney, Agent, or Firm*—Svetlana Z. Short

(57) ABSTRACT

An optical component including: a substrate made from heat absorptive glass having a front surface and a rear surface, at least one of said surfaces being a crenulate surface having optical power.

8 Claims, 5 Drawing Sheets

Fig. 3a(1)
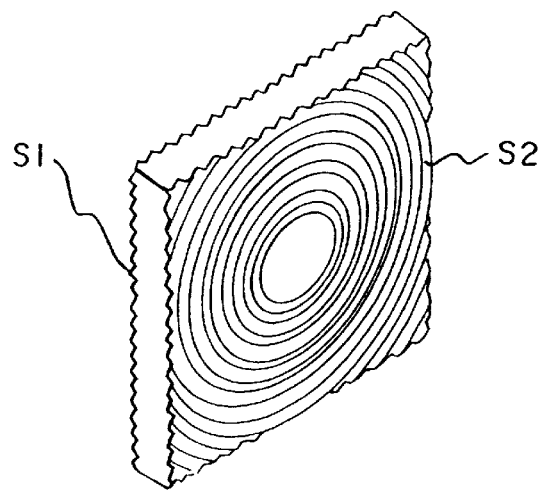
Fig. 3a(2)
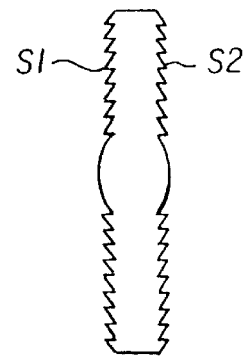
Fig. 3b(1)
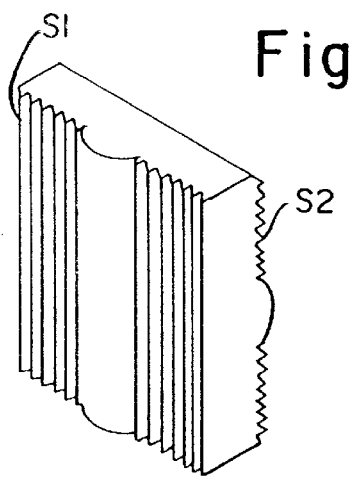
Fig. 3b(2)
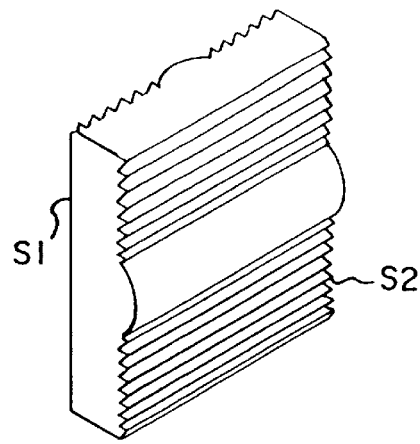
Fig. 3b(3)
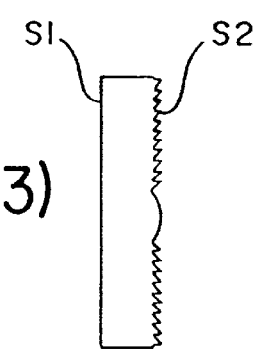
Fig. 3b(4)
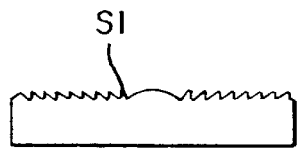

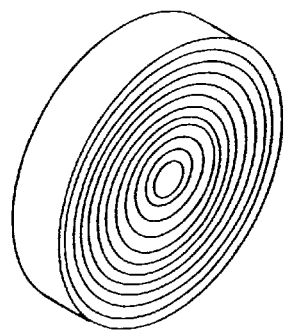
Fig. 3c(1)
Fig. 3c(2)
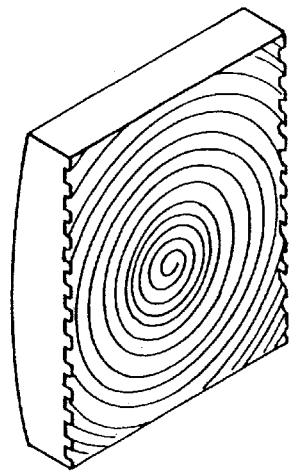
Fig. 3d(1)
Fig. 3d(2)

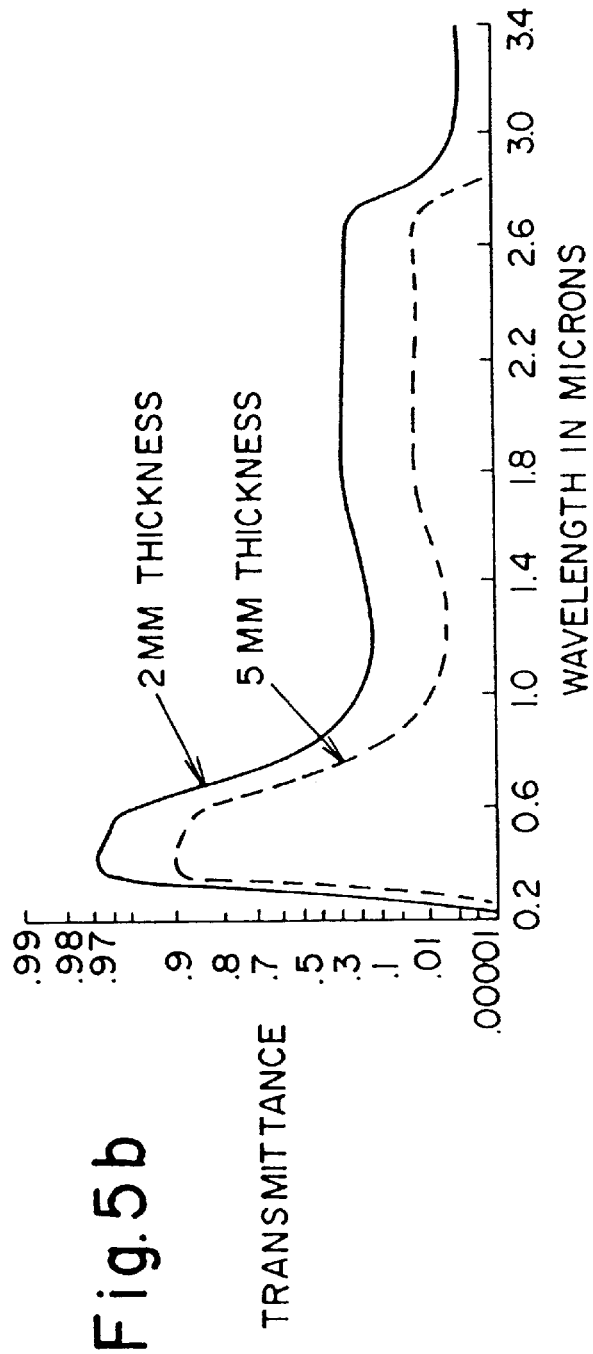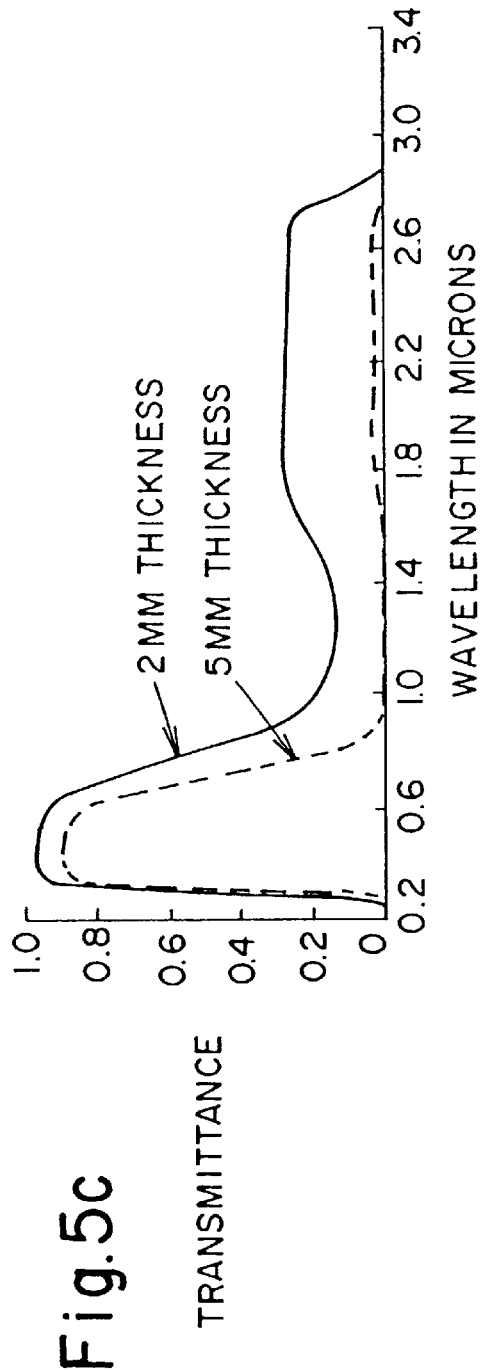
Fig. 5b
Fig. 5c

COMBINED HEAT FILTER AND CONDENSER LENS, A PROJECTION TYPE APPARATUS USING SUCH, AND A METHOD FOR FABRICATING IT

This is a Continuation of application Ser. No. 08/413,050, filed Mar. 29, 1995 now abandoned.

BACKGROUND OF THE INVENTION

1. Field of the Invention

The present invention relates generally to devices utilizing heat filters and condenser lenses and, in particular, to projection aparatii and similar devices.

2. Description of the Prior Art

It is a common experience of 35 mm projection slide viewing to have watched a valuable yet fragile slide crinkle up in the projection gate because a broken heat filter was not replaced before the projector was used again. This experience is not limited to 35 mm slide projectors but occurs in other projection type devices utilizing a separate heat filter.

U.S. Pat. No. 4,850,685 (col. 3, lns. 65–68) refers to a separate condenser lens and a heat filter that are combined in light source member module (i.e. housing). This approach does not solve the broken heat filter problem.

U.S. Pat. No. 3,953,730 also refers to a condenser which contains a heat filter 190. However, the condenser lens elements are separated from the heat filter even though they are located in the same "condenser module."

SUMMARY OF THE INVENTION

It is an object of the present invention to provide efficient means for projection viewing, and in particular projection slide viewing, that would prevent a heat-related breakup of a heat filter in projection type devices.

It is also an object of the present invention to provide a single optical component capable of serving both as a condenser lens element and as a heat absorption filter.

These and other objects are achieved by a heat absorptive optical component having a front surface and a rear surface where one of the surfaces is a crenulate surface having optical power.

According to one embodiment of the present invention, the crenulate surface is a diffractive surface.

According to another embodiment, it is a Fresnel surface.

It is also an object of the present invention to provide a projector apparatus comprising an integral condenser lens element and heat filter.

The crenulate surface serves two purposes. First, it permits design of a condenser lens with a uniform or near uniform thickness and therefore, uniform heat absorption. Second, it provides much more surface area than a plano or spherical surface to re-radiate or otherwise dissipate the heat. This latter feature greatly reduces the tendency of the element to break.

An additional advantage of the invention is the reduction in the number of optical components required in an assembly of the projector-type devices with a corresponding reduction in parts costs as well as assembly costs and the increased quality of such devices (no prize slides fried before an audience).

BRIEF DESCRIPTION OF THE DRAWINGS

FIGS. 3a–3d are exploded geometric views of the various optical components used in the projection apparatus shown in FIG. 2. In each of the FIGS. 3a–3d, the crenulate nature of the surface(s) of these optical components is shown exaggerated for illustrative purposes.

FIGS. 5a, 5b and 5c show spectral characteristics of some specific exemplary heat absorption materials.

DESCRIPTION OF THE PREFERRED EMBODIMENT

In order that the differences and advantages provided by the present invention be better appreciated, a brief description of the prior art projection apparatus will be given with reference to FIG. 1.

Figure 1:
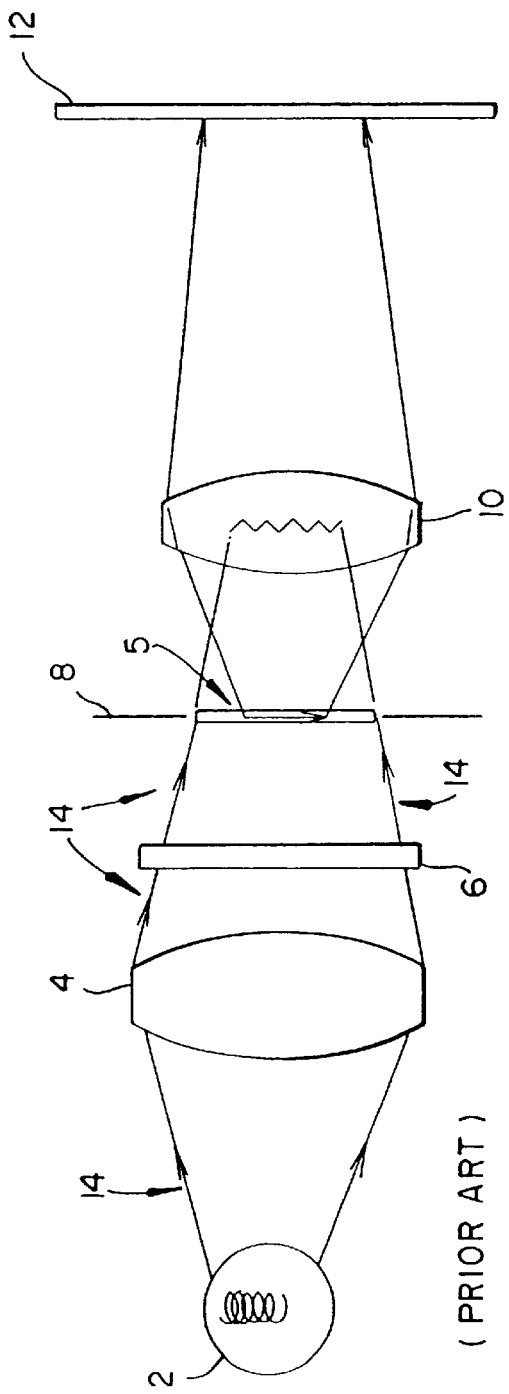
FIG. 1 is a side view of a schematic diagram of a prior art projection apparatus.

In essence, the prior art projection apparatus shown in FIG. 1 comprises:

1) A light source 2 such as a filament for illuminating an object to be projected 5 such as a film, a slide or a negative with light rays 14;
2) A condenser lens 4 for providing illumination on the object to be projected in cooperation with the light source 2;
3) A heat filter 6 for screening the object to be projected such as a negative 5 from the heat generated by the light source 2;
4) A film gate 8, located behind the heat filter 6; and
5) A projection lens 10 for projecting an image of the negative on a screen 12.

The condenser lens 4 projects an image of the filament 2 into the exit window of the projection lens. The heat filter 6 is made from a heat absorptive material. Some examples of heat absorbing optical glasses are: Corning 4605, PPG 2043, and Schott KG-2. The projection lens 10 projects an enlarged image of the slide or the negative 5 located in the film gate onto a viewing screen 12.

Referring now to FIGS. 2 and 3a–3d, the improved combined heat filter/condenser lens of the present invention and the projection-type apparatus used in conjunction with it, will be now described.

The present invention provides a single optical component (FIGS. 3a–3d) that performs both as a condenser lens element and a heat absorption filter. That is, the present invention solves the problem associated with the prior art (i.e. broken heat filters and fried slides) by creating a single optical component that is both the condenser lens element and the heat absorber.

If the typical condenser element is made from heat absorbing glass, the geometry of a single element condenser (i.e. it's being double convex) will cause more absorption in the center and less absorption at the edge. In addition, this geometry is not optimum for re-radiating the heat absorbed. The retained heat build-up is the main reason for the breakage of the prior art heat filters and this heat build-up is likely to cause breakage of this type of condenser element, because of its non-uniform heat absorption and less than optimum re-radiation of heat.

Figure 4:
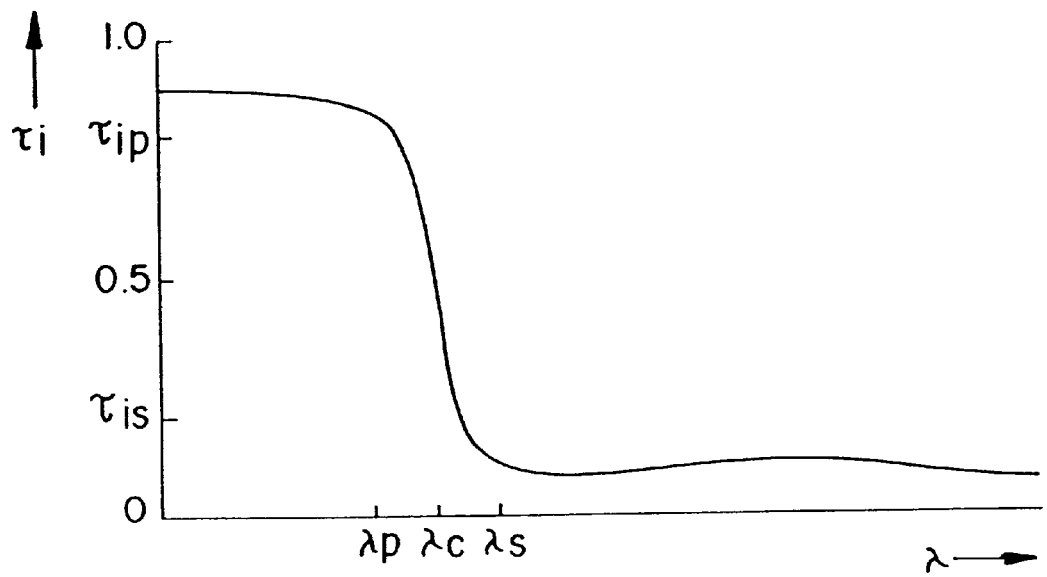
FIG. 4 illustrates general spectral characteristics of heat absorption materials.

The preferred embodiments utilize the technologies of diffractive or Fresnel optics (and precision glass molding) to produce a crenulate surface having optical power and to achieve a single (integral) optical component of uniform or nearly uniform thickness made of heat absorptive filter material. A heat absorptive component or material typically has a characteristic operation as shown in FIG. 4 (shown transmission τ vs. wavelength λ). That is, a heat absorptive optical component or a heat absorptive material has a high transmittance in visible wavelength region and a significantly lower transmittance in the near I.R. (infra red) wavelength region. For example, heat absorbing filter glass is a variety of glass that, like ordinary glass, transmits in the visible wavelengths (~0.45μ–0.65μ) but absorbs more radiation than ordinary glass in the infrared wavelengths (~0.8μ–1.5μ). Optical component 30 is sufficiently thick and heat absorbing that more than 50% of even intensity distribution of incident radiation between 0.8 μm and 1.5 μm is absorbed. Preferably, such component absorbs more than 75% in the 0.8 μm to 1.5 μm range. The absorption A of an optical component 30 can be calculated using standard transmittance tables.

The transmittance of the optical element is defined as:

$$T(x) = \frac{I(x)}{I_o},$$

where I(x) is the final intensity output from the optical element and $I_O$ is the original intensity going into the optical element, and x is the thickness of the optical component or element (i.e. the thickness of the material that the optical component or element is made of).

It is also known that one can find the transmittance $T(x_1)$ of any optical element or component of thickness $x_1$ if one knows its transmittance $T(x_2)$ at thickness $x_2$. That is, the value $T(x_2)$ (i.e. a transmittance of the material with the thickness $x_2$) for any given material can be found from the catalogs available to the public and the value $T(x_1)$ can be then calculated for any other thickness $x_1$ using the following equation:

$$T(x_1) = T(x_2)^{\frac{x_1}{x_2}}.$$

The absorption A of the optical component is A=1−T, where T is the transmittance value of that component.

The optical component 30 of the present invention has a focusing crenulate surface such as a diffractive or Fresnel surface on one or both sides of the optical component. It is preferable that both surfaces be crenulate surfaces because such a surface has a larger surface area than an ordinary lens surface. Allowing such a surface to participate more in heat dissipation allows the optical component to stay cooler and minimizes its potential for breaking. According to a first embodiment of the present invention, the optical component is illustrated in FIG. 3a. Both the perspective view and the side view are shown. This optical component is a plano-plano plate (or a substrate) made of a heat absorption glass such as Corning 4605 glass or a similar heat absorbing material and thus can serve as an absorption filter. Both the front surface S1 and the rear surface S2 are crenulate surfaces. As used herein the word plano implies a generally plano rather than curved appearance.

Figure 5A:
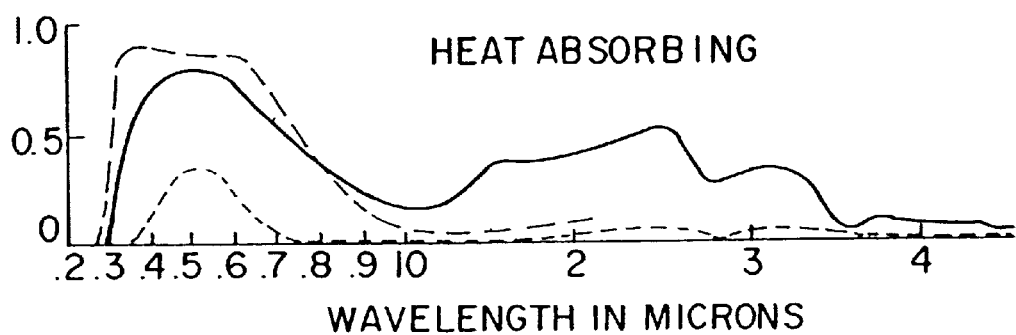

As stated above, a heat absorption filter or a heat absorptive optical component is made of an I.R. (infrared) absorbing material. These materials have low transmittance in the I.R. region and high transmittance in the visible wavelength region. FIG. 4 shows typical spectral characteristics of these materials. Such materials are well known in the art and such heat absorption glasses are available from many glass manufacturers. The important properties applicable to heat absorption materials are: the edge position $\lambda_e$, i.e. the wavelength at which the spectral internal transmittance is half its maximum value; the limit $\lambda_s$ of the blocking range, i.e. above this wavelength range the spectral transmittance limit $\tau_{is}$ is not exceeded; and the limit $\lambda_p$ of the pass-band, i.e. below this wavelength spectral transmittance does not fall below the limit $\tau_{ip}$. The specific absorption characteristics of such filter will depend on the thickness of the particular filter and the specific material being used. FIGS. 5a and 5b show spectral characteristics of some exemplary glass materials. More specifically, FIG. 5a shows the transmission characteristics of heat absorptive glass filters: solid, Corning 1-59 extra light Aklo; dashed, Pittsburgh Plate Glass #2043 Phosphate 2 m.m.; dotted, Corning 1-56 dark shade Aklo. FIG. 5b illustrates the spectral transmittance of Schott KG-2 heat absorbing filter glass. The upper graph is plotted on a log-log scale. Note that the vertical spacing between the two plots is equal to the distance from 2 to 5 on the thickness scale at the right. The same data is plotted on a conventional linear scale in the lower figure for comparison.

The optical component of the first embodiment has a front and a rear sides S1 and S2 which are diffractive. However, a Fresnel surface could also be used. The diffractive pattern is comprised of a diffractive structure arranged in a pattern of circular symmetry or in a spiral pattern. The diffractive surfaces may provide both a focusing and a achromatizing function. Thus, according to the present invention the optical component also acts as a condenser lens and can re-image the light source such as a filament onto a desired location (onto a projection lens, for example).

Finally, using two diffractive surfaces (FIG. 3b), an anamorphic system can be designed resulting in a diffractive or Fresnel equivalent of crossed cylindrical lens elements. If the diffractive structure is used, it is arranged on both sides of an otherwise plano-plano piece of heat absorbing glass in linearly symmetric patterns where the axis of symmetry are crossed at ninety degrees to simulate two crossed cylindrical lens elements in an anamorphic system.

FIG. 3c illustrates a second embodiment according to the present invention. It again comprises a plano-plano absorption plate, but only one of the surfaces is diffractive. The diffractive or Fresnel surface provides the optical power thus allowing this optical component to act as a lens element.

FIG. 3d illustrates a third embodiment of the present invention. It comprises a convex-plano absorption lens element. Again, at least one of the surfaces (preferably a plano surface) is diffractive. The optical power of this optical component is provided by both the convex and the diffractive surface. More specifically, in the third embodiment the front surface S1 is convex and a second, or the rear surface S2, is a Fresnel surface or a diffractive surface located on a plano substrate. Care must be taken not to make the refractive (i.e. convex) surface too strong in order to avoid excessive heat build up in the middle section of the optical component.

Figure 2:
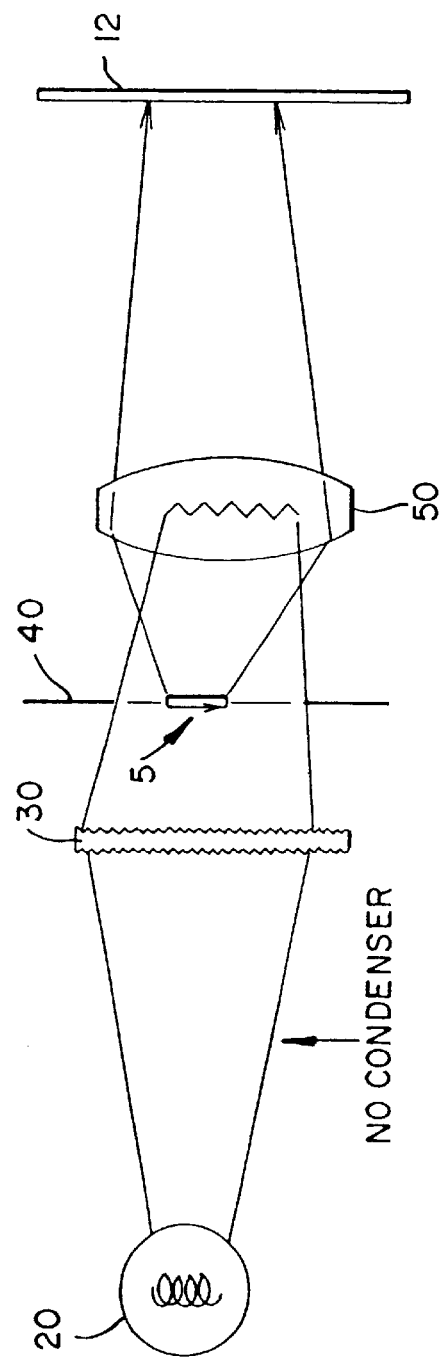
FIG. 2 is a side view of a projection apparatus according to the preferred embodiment of the present invention.

FIG. 2 illustrates an a projection type apparatus using such an optical component in accordance with the present invention. In essence, it comprises a light source 20 such as a filament and a new and improved optical component 30 which is a combination heat filter and a condenser lens element, a film gate 40 and a projection lens 50. No separate condenser lens is required. The filament illuminates the new optical component directly. Because this optical component is made from a heat filter material it protects a valuable slide or a negative from being burned. Because this optical component has at least one crenulate surface with optical power (i.e. a surface that is either diffractive or Fresnel), the optical component also serves as a focusing lens element and illuminates a slide or a negative by re-imaging the filament onto a desired location (as at the projection lens, for example). The projection lens produces an enlarged image of the slide or the negative 5 located in the film gate plane and projects it onto a viewing screen 12.

As mentioned above, the combination heat filter/condenser lens element (i.e. the optical component according to the present invention) can be made by any glass molding method including, for example, a precision glass molding method. The tempering process used in heat-filter production would be then unnecessary because the molding process itself approximates it. In fact, it is preferred that such optical components be manufactured by a molding process because conventional grinding and polishing techniques are likely to leave too fragile a surface to survive the heat environment. That is, conventional grinding and polishing methods are likely to create minute surface or subsurface damage which is likely to propagate in the forms of cracks and shatter the optical component when it is repeatedly subjected to an intense heat.

Tooling for molding can be achieved by 1) coating standard molding materials with any of the materials known to be easily diamond turned, such as electroless nickel and 2) single-point-diamond-turning the required patterns into the nickel or other such material. This pattern is then etched by ion beam milling technology into the substrate tool material which becomes the actual tool used in molding. The substrate tool material can be any of the known glass molding materials as described in patent or technical literature.

The invention has been described in detail with particular reference to a preferred embodiment thereof, but it will be understood that variations and modifications can be effected within the spirit and scope of the invention. More specifically, it should be understood that the present invention is not limited to optical projectors and that other optical applications that use a combined heat filter/lens element also fall within the scope of the present invention. It should also be noted that an optical component made of heat absorptive material and having any type of a crenulate surface, such as, for example, a Fresnel surface or a diffractive surface such as a binary, blazed or a holographic surface having optical power fall within the scope of the present invention.

What is claimed is:

1. A projection apparatus comprising:
   1) a light source;
   2) a support for supporting an object to be projected;
   3) a single optical component spaced from and situated on one side of said support, said optical component being an integral condenser lens element and heat absorbing filter; and
   4) a projection lens situated on the other side of said support.

2. A projection apparatus according to claim 1, wherein said optical component is made from heat absorptive glass and has a front surface and a rear surface where one of said surfaces is a crenulate surface having optical power.

3. A projection apparatus according to claim 2, wherein said crenulate surface is a Fresnel surface.

4. A projection apparatus according to claim 3, wherein said single optical component has two plano surfaces.

5. A projection apparatus according to claim 2, wherein said crenulate surface is a diffractive surface.

6. A projection apparatus according to claim 1, wherein said single optical component has two plano surfaces.

7. A projection apparatus comprising in order:
   1) a light source for illuminating an object to be projected;
   2) a single, combined condenser lens element/heat absorbing filter component for providing illumination provided by said light source on the object to be projected and for screening the object to be projected from the heat generated by said light source; and
   3) a projection lens for projecting an image of said object to be projected on a screen.

8. A projection apparatus according to claim 7, wherein said single optical component has two plano surfaces.

* * * * *